United States Patent Office 2,991,900
Patented July 11, 1961

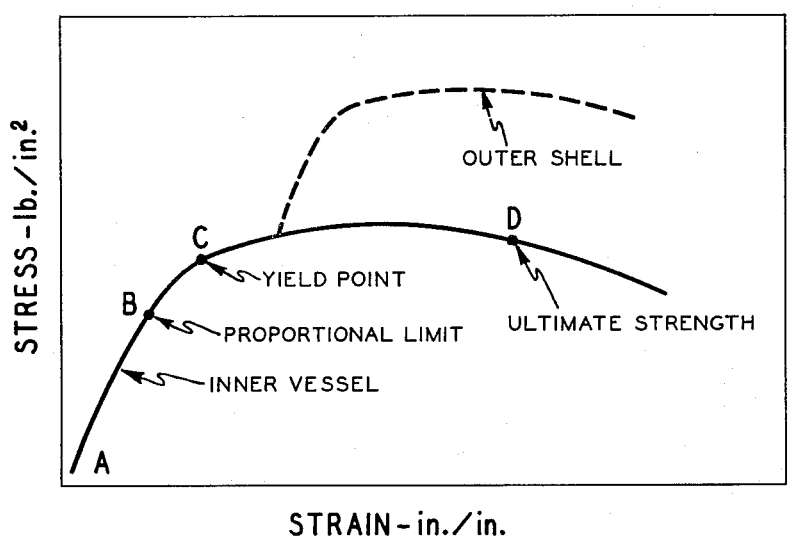
Fig. 1.
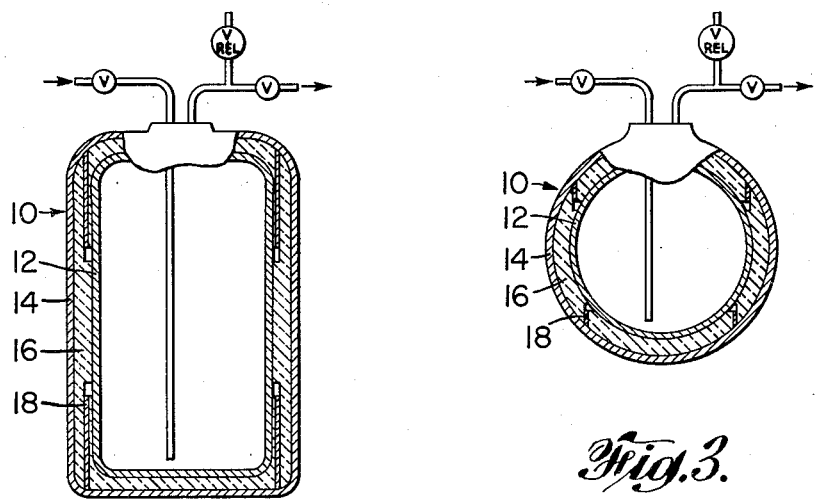
Fig. 2.
Fig. 3.

2,991,900
LIGHT WEIGHT DOUBLE-WALLED CONTAINER
Richard M. Poorman, Indianapolis, Ind., assignor to Union Carbide Corporation, a corporation of New York
Filed Oct. 15, 1958, Ser. No. 767,405
3 Claims. (Cl. 220—15)

This invention relates to a light weight, double-walled container for holding fluids, such as liquefied gases under pressure, and more particularly to such a container having walls comprising an inner vessel and outer shell with an interspace between the walls.

Double-walled containers, particularly of the type for holding fluids under pressure and at sub-atmospheric temperatures, and generally of such construction as to provide a heat insulating space between the inner vessel and outer shell. This space, depending on the condition to be maintained within the inner vessel, may be packed with a suitable insulating material, or maintained empty in a highly vacuumized state, or be filled with a porous insulating material and evacuated of gases.

Ordinarily, gas containers or vessels are designed and constructed to withstand internal pressures up to certain expected maximum working pressures, and in the event such expected values are exceeded, the vessel is provided with some form of safety release device. Containers for compressed and liquefied gases usually are provided with a relief valve capable of venting the confined gas to atmosphere if the maximum working pressure is exceeded.

The standards presently employed for double-wall pressure vessels require that the inner container shall independently withstand pressures up to a stipulated bursting pressure. This valve is usually several times the maximum expected working pressure. Since pressures up to the designed bursting values are rarely attained in practice, it appears that present double-wall vessels are over designed with an excessive use of material thickness for the inner container. Since the space between the inner and outer containers is usually evacuated, the outer container is designed to independently have elastic stability against external compressive forces.

While such pressurized gas vessels have been adequate for ordinary use, the diversified applications to which they have been adapted demand more than conventional type of vessel has been able to provide.

For example, current trends of the aircraft and associated industries, tend to place must emphasis on pressurized liquid fuels and gases for use on high altitude equipment. These industries have consequently indicated a pressing demand for a type of gas container adaptable to meeting the dual requirements of pressure resistance, and primarily lightness of weight.

It is therefore the principal object of the present invention to provide a light weight, double-wall vessel for containing a gas or liquefied gas at working pressures. A further object is to provide a vessel which, under abnormal pressure conditions, will fail in a relatively safe manner.

FIG. 1 is a stress-strain curve graphically depicting the characteristics of the invention;
FIG. 2 is a cross sectional elevation view of an embodiment of the invention incorporated in a cylindrical container, and
FIG. 3 is a cross sectional elevation view of the invention in a spherical type of container.

Referring to FIGS. 2 and 3 which illusltrate exemplary embodiments of the present invention, there are respectively illustrated a cylindrical and a spherical pressurized gas container 10. Said container comprises an inner metallic vessel 12 having a surrounding shell 14 outwardly spaced therefrom to define a space 16 therebetween. Said space, according to the invention, is of a pre-determined width and is provided with a plurality of elements 18 which extend between the shell and vessel to supportably maintain the latter in a relatively fixed position.

In a spherical container the spacing between the inner and outer walls is usually uniform, while in a cylindrical container the spacing may be non-uniform throughout to account for different heat-leak and expansion problems at the ends of the container as contrasted with those along the sides.

Accordingly, the inner vessel and outer shell wall thickness, the space between said walls, and the particular materials of construction used, are designed and co-related as to be functionally interdependent to attain the objects of the invention. In effect, there is provided a novel, light weight pressure container wherein the wall thickness of the inner vessel is thinner than presently used.

The inner vessel is designed so as to yield and stretch at pressures above the maximum expected working pressure. Thus, the inner vessel can freely expand until it effectively touches the outer shell, their combined strength then resists bursting under an excessive pressure.

For instance, in a preferred modification of the present invention, the inner vessel, if made of a material as stainless steel, will be such that the wall, when outwardly stretched by an internal pressure, will have expanded to substantially its elastic limit when the container's maximum anticipated internal design pressure has been reached. At pressures beyond this maximum value, if not alleviated by a relief means, the vessel will expand beyond its yield point until it is effectively supported by the adjacent outer shell; thereafter the vessel will resist further increases of pressure without rupturing in accordance with the combined strengths of inner and outer walls.

This sequence of events produces, in effect, an equivalent of a single wall container having a combined wall thickness equal to that of the stretched inner container plus that of the outer shell. The new effective thickness will now be able to safely withstand increased pressure up to the designed bursting pressure.

With reference to FIG. 1, there is shown a stress-strain curve representative of the amount of strain or deflection produced in a gas container by virtue of a particular internal pressure. Applying the curve to the present invention, outwardly expansive movement of the inner vessel and outer shell increases directly in proportion to the pressure induced stresses in said vessel and shell walls.

Initial elastic movement of the inner vessel wall is illustrated by that section of the curve between points A—B, commonly referred to as the material's elastic range. This range indicates the amount of temporary deflection the vessel will assume under an internal pressure and still be capable of resuming its normal shape after such pressure is abated.

When the inner vessel's walls are caused to expand beyond their elastic limit, continued application of internal pressure will result in a wall deformation indicated between point C, the material's yield point, and D, its ultimate strength. Beyond this latter point the wall will stretch quite rapidly until ultimately fracturing.

In accordance with the invention, the inner vessel is permitted to freely expand through its proportional range A—B and up close to its elastic limit. For stainless steel, a commonly used material of construction for pressure vessel, this proportional expansion is quantitatively quite small for the thicknesses used.

When point B is approached, the internal pressure within the vessel will be tending to exceed the maximum value expected under normal operating conditions and beyond which the relief valve should operate.

The inter-wall space is sufficiently thick to permit some outward expansive movement of the inner vessel. When the inner vessel's yield point has been exceeded, but the ultimate strength has not yet been reached, the wall will be just contacting the surrounding shell or will have compressed intervening insulation into effective supporting contact. It is seen then that further expansive movement, although permanetly deforming the inner container, will be resisted by a force proportional to the combined vessel and shell wall thicknesses.

Continued expansion of the combined walls will thereafter proceed depending on the internal pressure increase, until one or both of said walls exceed their bursting strength. The composite wall has, in effect, permitted full utilization of the pressure vessel's construction, yet allowed an important reduction of internal container wall thickness with the consequent reduction in weight.

The following calculations will serve to illustrate the particular advantage of a cylindrical container of the type shown in FIG. 2, constructed according to the present invention; as contrasted with a similar one of conventional design of the same internal capacity. It is assumed, for purposes of calculation, that failure will occur in the side walls rather than at the ends.

*Vessel requirements*

Capacity of internal vessel__ 25 liters (13.9 in. diameter and 10.1 in. length).
Inter-wall space thickness__ 0.5 inch.
Material of construction__ Type 302 stainless steel.
Normal internal pressure__ 300 p.s.i.g.
Maximum expected internal working pressure____ 320 p.s.i.g. (yield point).
Bursting pressure _____ At least 4 times normal pressure (1245 p.s.i.g.).

Type 302 stainless steel has about 50% elongation at rupture. Both the diameter and circumference of the containers will thus have equal elongation or expansion. Assume the inner container has 50% elongation at rupture and the outer container has about 40%. A vessel of this size should have internal container walls 0.040 inch thick in order to have a yield point at 320 p.s.i.g. internal pressure.

$$\text{Bursting pressure} = \frac{2(S_0 t_0 + S_1 t_1)}{D}$$

$S_1$ = inner container stress at rupture with 50% elongation $(2.1 \times 10^5 \text{ lb./in.}^2)$
$S_0$ = outer container stress at rupture with 40% elongation $(1.9 \times 10^5 \text{ lb./in.}^2)$
$t_0$, $t_1$ = wall thickness (0.040 inch)
$D$ = burst diameter of container (21 inches = 13.9 + 13.9 × 0.5)

$$\text{Burst pressure} = \frac{2(1.9 \times 10^5 \times 0.040 + 2.1 \times 10^5 \times 0.040)}{21}$$
$$= 1525 \text{ p.s.i.a. } (1510 \text{ p.s.i.g.})$$

It thus appears that container walls 0.04 inch thick can withstand internal pressures up to about 1500 p.s.i.g. without rupture.

A vessel of the same capacity and material designed by prior methods wherein the inner wall must withstand the full bursting pressure, would have an inner wall about 0.076 inch thick. It can be seen that in the above example the novel improved container has about ½ the wall thickness in the inner vessel and thus about ¾ the total weight and material cost of prior vessels of the same capacity.

In a like fashion, a spherical container of the type shown in FIG. 3 would have less weight when constructed according to the present invention as contrasted with prior art vessels.

The invention is not limited to the details employed in the above example since various materials of construction, vessel size, and pressure ranges could be used. One important condition which must be met, for maximum weight saving, is that the inner vessel of the double-wall pressure container be of such material and thickness that it has incipient yielding at the maximum expected working pressure. While this is a preferred condition, it is understood that the advantages of the invention can be obtained in varying degrees by employing an internal container wall thickness in the range from that having incipient yielding at the maximum expected working pressure up to a thickness slightly less than that which independently withstands designed bursting pressure.

Another important condition is that the elongation property of the inner vessel, and the insulation space thickness be selected so that the inner vessel can expand until it is essentially in contact with the outer container or supported by the outer container walls through compressed insulating material, before it ruptures.

What is claimed is:

1. A double-walled insulated storage container for fluids comprising an inner vessel, a surrounding shell, an insulating inter-space therebetween, and fluid conduit means communicating with the inner vessel, said inner vessel being outwardly expandable and having a wall of sufficient thickness to withstand normal internal pressure in said container and co-related to said interspace whereby said inner vessel, when outwardly urged by an internal container pressure in excess of a pre-determined normal value, will expand beyond the yield point thereof and contact said surrounding shell such contact between the inner vessel and the outer shell occurring before the ultimate strength of the inner vessel has been reached, further outward expansion being restrained by the combined thicknesses of said inner vessel and outer shell.

2. A double-walled heat insulated storage container essentially as described in claim 1 wherein the insulating inter-space is maintained under a partial vacuum.

3. A double-walled vacuum insulated storage container for fluids comprising an inner metallic pressure vessel, an outer metallic shell and a substantially uniform insulating space therebetween, said inner vessel being outwardly expandable and having a wall thickness being directly co-related to said insulating space whereby said inner vessel will expand beyond the physical yield point thereof when subjected to an inner container pressure in excess of a maximum expected container working pressure, said insulating inter-space being of sufficient thickness to permit effective contact between said inner and outer vessels prior to the expension of said inner vessel beyond its physical ultimate strength, further expansion thereafter restrained by the combined thickness of inner and outer vessel walls.

References Cited in the file of this patent

UNITED STATES PATENTS

| | | |
|---|---|---|
| 544,791 | Ferguson et al. | Aug. 20, 1895 |
| 2,256,673 | Hansen | Sept. 23, 1941 |
| 2,587,204 | Patch et al. | Feb. 26, 1952 |
| 2,652,943 | Williams | Sept. 22, 1953 |
| 2,694,632 | Holgersson et al. | Nov. 16, 1954 |